United States Patent Office 3,162,011
Patented Dec. 22, 1964

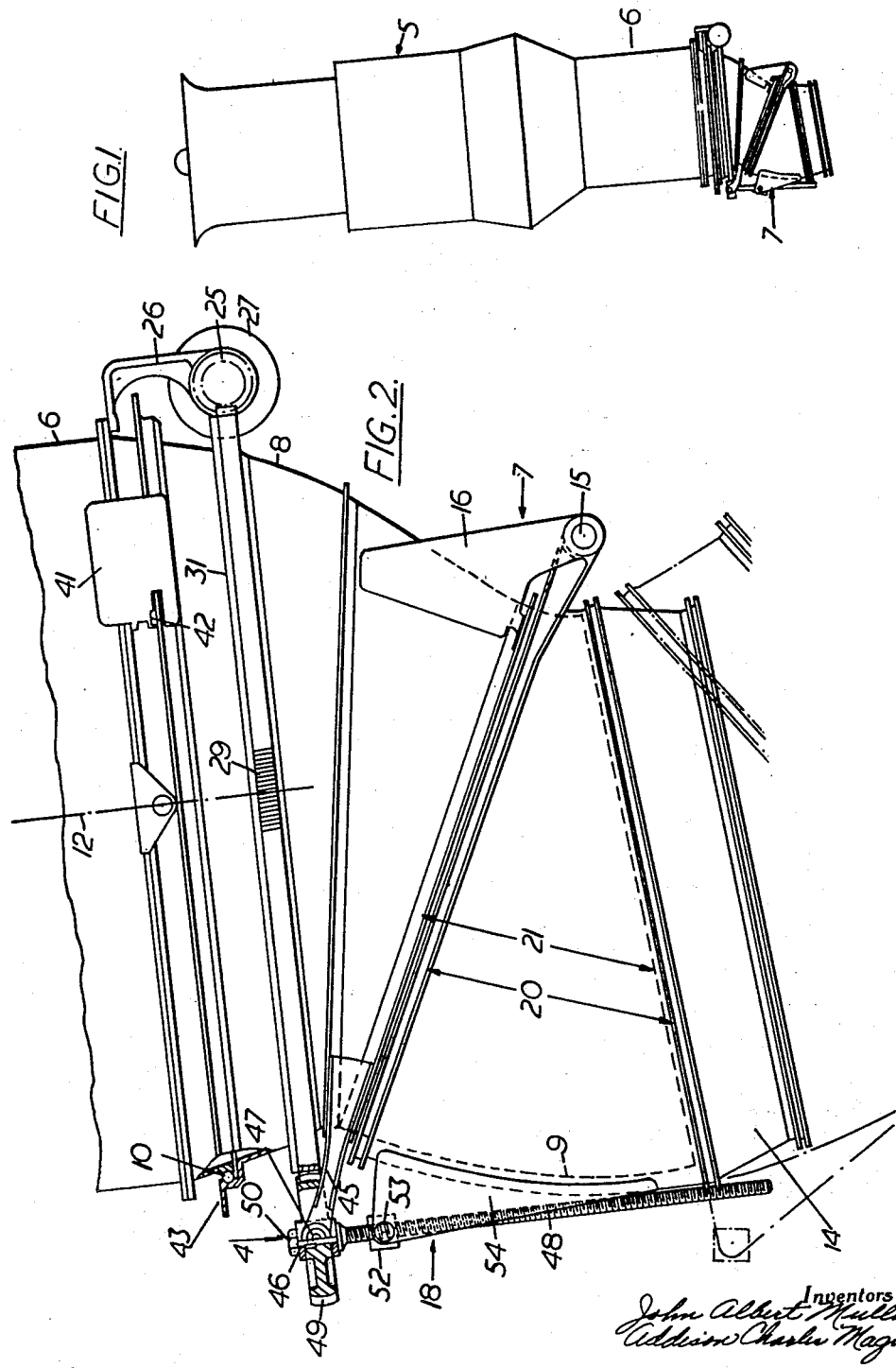

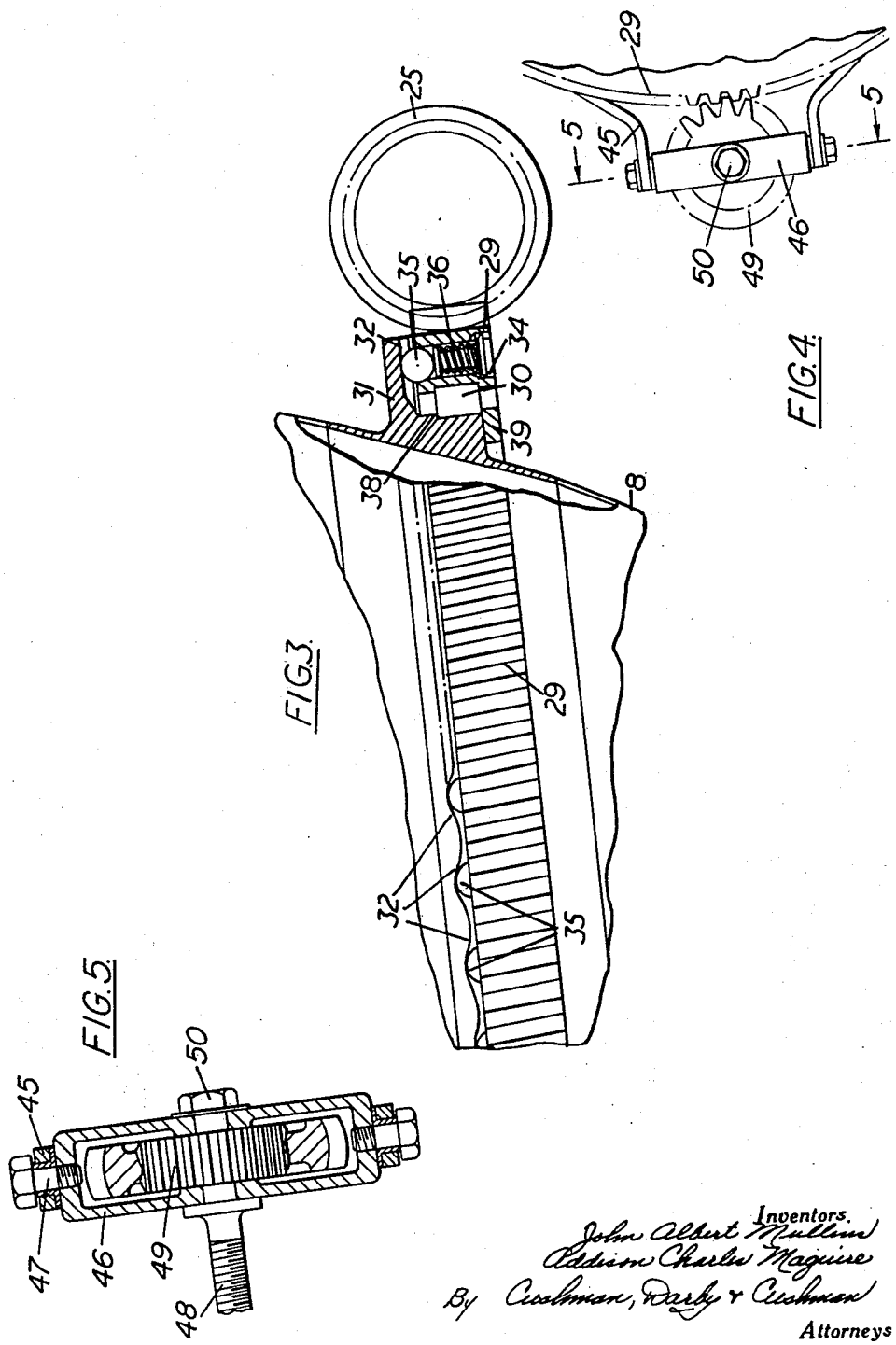

3,162,011
DEFLECTING JET DISCHARGE NOZZLES FOR JET PROPULSION ENGINES
John Albert Mullins, Darley Abbey, and Addison Charles Maguire, Alvaston, England, assignors to Rolls-Royce Limited, Derby, Derbyshire, England, a company of Great Britain
Filed Feb. 7, 1963, Ser. No. 256,875
5 Claims. (Cl. 60—35.55)

This invention is concerned with improvements relating to nozzles e.g. jet discharge nozzles suitable for use for deflecting the exhaust gas stream of a gas turbine jet propulsion engine. Nozzles in accordance with the invention may be used for example for attitude control e.g. in vertical take-off aircraft, where the nozzles serve to vary the direction in which gaseous jets are discharged downwardly from the aircraft. The nozzles may for example give the jets a forward, sideways or rearward component of velocity relative to the aircraft.

According to the present invention, a nozzle comprises a hollow casing member through which a fluid is discharged, and an outlet member which is pivotally and rotatably mounted on the casing member adjacent the downstream end thereof, said outlet member receiving fluid discharged from the casing member and deflecting said fluid in a direction depending on the position of said outlet member relative to the casing member, said nozzle having a common drive device adapted to effect both rotating and pivoting movement of said outlet member relative to said casing member.

By the expressions that the outlet member is pivotally and rotatably mounted on the casing member, we mean respectively that the outlet member can be adjusted to vary the angle its longitudinal center line makes with the longitudinal center line of the casing member, and that the outlet member can rotate about at least a portion of its own longitudinal center line.

Preferably the nozzle includes a hollow support member, a first mounting interconnecting said support member to said casing member, and a second mounting interconnecting said outlet member to said support member, whereby fluid discharged from said casing member passes through said support member and said outlet member in series flow, one of said mountings permitting relative rotation between the parts interconnected thereby, and the other of said mountings permitting relative pivoting movement between the parts interconnected thereby.

Preferably said one mounting and said other mounting are said first and second mountings. Said support member may for example be so shaped that the longitudinal center line of support member adjacent the outlet thereof is parallel to but laterally spaced from the longitudinal center line of the casing member. Preferably said outlet member is pivotally mounted on said support member about a pivoting axis extending at right angles to the longitudinal axis of the casing member, said pivoting axis being so located externally of both said outlet and support members that the longitudinal center line of the casing member passes between the longitudinal center line of the support member adjacent the outlet thereof, and said pivoting axis, said outlet member having a surface which is curved about said pivoting axis and which co-operates with said support member.

The drive device may be mounted on said casing member, and may be operatively associated with said support member by a releaseable clutch, and being so operatively connected to said outlet member that operation of said drive device effects relative movement between said casing and support members, or between said support and outlet members, depending on whether said releaseable clutch is engaged or disengaged.

A gear wheel drivingly engaged by said drive member may be rotatably mounted about said support member, said releaseable clutch being interposed between said gear wheel and said support member, the gear wheel being operatively connected to said outlet member to effect relative pivoting movement between the outlet member and the support member when said gear wheel rotates relatively to said support member. Preferably the operative connection between said gear wheel and said outlet member comprises a pinion carried by said support member and engaging said gear wheel, and a screw-and-nut drive means, the screw of which is connected to said pinion and the nut of which is connected to said outlet member.

The nozzle may include stop means which serves when operative to prevent relative movement between said support member and said casing member, said releasable clutch being adapted automatically to disengage when said stop means is inoperative.

Preferably said releaseable clutch comprises at least one detent member carried by one of said gear wheel and said support member, said detent member being resiliently urged into engagement with a registering one of a plurality of recesses in the other of said gear wheel and said support member, but being releasable therefrom when the stop means is operative and the gear wheel rotates about said support member.

Said stop means may be formed as a brake or a clamp which can be operated to hold the support member in any of the possible positions it can occupy relative to the casing member. Preferably, however, said stop means comprises engageable abutments which are carried by said support member and said casing member respectively.

According to a further aspect of the invention, there is provided an engine which discharges a gaseous jet stream, e.g. a gas turbine jet propulsion engine or a turbine driven fan unit, said engine having a nozzle as mentioned above through which said jet stream is discharged.

One preferred embodiment of the invention will now be described by way of example only with reference to the accompanying drawings in which:

FIGURE 1 is a side view of a vertical lift gas turbine jet propulsion engine having a jet discharge nozzle in accordance with the invention.

FIGURE 2 is an enlarged diagrammatic part-sectional view of the nozzle of FIGURE 1, FIGURE 3 is an enlarged diagrammatic part-sectional view of a releasable clutch used in the nozzle of FIGURE 2.

FIGURE 4 is a view of part of the gearing taken in the direction of arrow 4 indicated on FIGURE 1, and FIGURE 5 is an enlarged section taken on the line 5—5 indicated in FIGURE 4.

With reference to FIGURE 1, the internal details of the gas turbine engine are not shown, but comprise in the usual manner, compressor means, combustion means and turbine means arranged in flow series within the engine casing 5, the exhaust gases from the engine being discharged through a casing member 6. If desired the gas turbine engine or the exhaust gases therefrom can drive a fan unit (not shown) also mounted within the engine casing 5, in which case fan air and turbine exhaust gases are discharged through the casing member 6. The engine has a discharge nozzle generally indicated by 7, and when mounted in an aircraft, the engine is normally slightly inclined forwardly from the vertical as shown.

A hollow support member 8 (FIGURE 2) whose extent is indicated by the dash lines 9, is rotatably mounted on the casing member 6 by bearings 10. The support member 8 has a curved longitudinal center line, which adjacent its outlet is approximately parallel to but laterally spaced from the longitudinal axis 12 of the casing member 6.

An outlet member 14 is pivotally mounted by means of a pivot 15 which is carried by a bracket 16, the latter being connected to the support member 8, and the outlet member 14 can be adjusted from the position which is shown for the most part in full line, to the position indicated in chain line, by a screw-and-nut mechanism denoted generally by 18. The outlet member 14 has a surface 20, which in the full-line position of the outlet member, overlies the surface 21 of the support member 8, and both the surfaces 20, 21 are curved about the axis of the pivot 15, and co-operate to prevent the escape of gas therebetween. If desired conventional sealing means (not shown) may be interposed between the surfaces 20, 21.

Considering now the mechanism for adjusting the members 8 and 14, a drive device in the form of a worm wheel 25 is rotatably mounted in a bracket 26 supported from the casing member 6. The worm wheel 25 is driven by a reversible motor 27 e.g. a reversible electric motor. The worm wheel 25 meshes with a worm gear 29 which is rotatably mounted about the support member 8 by roller bearings 30 (see FIGURE 3). The support member 8 has a flange 31 whose underside is provided with a plurality of radially extending recesses 32, the walls of which, when viewed a side elevation as shown at the left hand side of FIGURE 3, are of waveform.

The worm gear 29 has around its angular extent a plurality of angularly spaced bores 34, in each of which a ball 35 is located and urged outwardly by a spring 36 to engage a registering one of the recesses 32. The worm gear 29 is prevented from moving axially relative to the flange 31 by the bearings 30, which in turn are held in position by a flange 38, and a ring 39 which is secured to the bottom surface of the flange 31. Thus when the worm wheel 25 is rotated, the worm gear 29 is coupled to the support member 8 by the balls 35, and will rotate the support member 8 relative to the casing member 6. If however relative movement of the support member 8 is prevented, e.g. by an abutment 41 mounted on the casing member 6 engaging a stop 42 on a flange 43 of the support member 8, rotation of the worm wheel 25 will cause the balls 35 to ride over the crests of the recesses 32 and permit the worm gear 29 to rotate about the support member 8. In effect therefore, the balls 35 resiliently engaging the recesses 32 provide a releasable clutch between the worm gear 29 and the support member 8.

A bracket 45 having a forked end is mounted on the support member 8 and the forked end pivotally supports a cage 46 through a pair of pivots 47 (FIGURES 4 and 5). A screw-threaded shaft 48 of the screw-and-nut mechanism 18 is rotatably mounted in the cage 46, and a gear wheel 49 is keyed to the shaft 48 where it extends through the cage 46, the shaft being held in place by a nut 50. The pivots 47 lie in the median plane of the worm gear 29, and the teeth of the gear wheel 49 are curved, so that should the shaft 48 pivot about the pivots 47, the gear wheel will still make correct meshing engagement with the worm gear 29. A nut 52 which is screw-threaded onto the shaft 48, is pivotally mounted about pivot 53 in a bracket 54, the latter being mounted on the outlet member 14. Thus when the worm wheel 25 is being driven and there is not relative rotation between the worm gear 29 and the support member 8, the latter and the outlet member 14 will rotate together without relative movement therebetween, on the bearings 10. If however the abutment 41 is engaged by the stop 42, continued rotation of the worm wheel 25 will cause the worm gear 29 to rotate about the support member 8, which will in turn rotate the gear wheel 49 and the shaft 48, and cause the nut 52 to progress along the shaft 48. Thus the outlet member will pivot about the pivot 15 relative to the support member 8.

The positions of the abutment 41 and the stop 42 are only shown diagrammatically in FIGURE 2. Assuming for the sake of illustration that there are two stops 42, each co-operable with opposite sides of the abutment 41, the motor 27 being reversible so that it can cause either stop to engage the abutment 41, the mode of operation of the nozzle will be as follows. When the motor 27 causes one of the stops to move out of engagement with the abutment 41, both the support member 8 and the outlet member 14 will rotate together. When the other stop 42 engages the abutment 41, the motor will pivot the outlet member about the pivot 15, say in a downward direction, and the motor can be stopped when desired. If then the motor is reversed, again both the support member 8 and the outlet member 14 will rotate together, until the first mentioned stop 42 engages the abutment 41, after which continued rotation of the motor 27 in the same direction will cause the outlet member 14 to pivot upwards about the pivot 15. Thus one stop 42 can be regarded as a "raise" stop for the outlet member 14, and the other stop 42 can be regarded as a "lower" stop. The outlet member can therefore be oriented to any desired position within the ranges of its rotational adjustment relative to the casing member 6, and its pivoting adjustment relative to the support member 8.

When the engine with the nozzle is mounted in a vertical take-off aircraft, one possible arrangement is for the abutment 41 and the two stops 42 to permit a 180° range of rotation of the support member 8 on the casing member 6, the longitudinal center line of the support member 8 in both its limiting positions lying in a vertical plane parallel to the longitudinal axis of the aircraft. The nozzle can direct the gases discharged therefrom substantially vertically, or with a forward, sideways or rearward component of velocity relative to the aircraft.

It will be appreciated that many modifications and variations may be made to the embodiment that has been described without departing from the scope of the invention. Thus for example the stop 42 and the abutment 41 may be adjustably mounted on their respective supporting members.

Alternatively or in addition, a brake may be mounted on the casing member 6 for preventing rotation of the support member 8 relative to the casing member as desired.

We claim:

1. A nozzle comprising a hollow casing member through which a fluid is discharged, a hollow support member, a first mounting connecting said support member to said casing member, a hollow outlet member, a second mounting connecting said outlet member to said support member, fluid which is discharged from said casing member passing successively through said support member and said outlet member and being deflected depending on the positions of the support member and the outlet member relative to the casing member, one of said mountings permitting relative rotation between the parts interconnected thereby, and the other of said mountings comprising a pivot connection and permitting only relative pivoting movement between the parts interconnected thereby, whereby said outlet member is both rotatable and pivotable relative to said casing member, said nozzle having a drive device for effecting both rotating and pivoting movement of said outlet member relative to said casing member, said drive device including a drive member which is mounted on the casing member, a releasable clutch by which said drive member is operatively associated with the support member, and drive mechanism operatively connecting said drive member to said outlet member, said releasable clutch depending on whether it is engaged or disengaged controlling whether operation of said drive member effects relative movement between said casing and support members, or between said support and outlet members.

2. A nozzle comprising a hollow casing member through which a fluid is discharged, a hollow support member, a first mounting connecting said support member to said casing member, a hollow outlet member, a second mounting connecting said outlet member to said support member, fluid which is discharged from said casing member passing successively through said support member and said outlet member and being deflected depending on the positions of the support member and the outlet member relative to the casing member, said first mounting permitting relative rotation between the support member and the casing member and said second mounting comprising a pivot connection and permitting only relative pivoting movement between the outlet member and the support member, whereby said outlet member is both rotatable and pivotable relative to said casing member, said nozzle having a drive device for effecting both rotating and pivoting movement of said outlet member relative to said casing member, said drive device including a drive member which is mounted on the casing member, a gear wheel rotatably mounted about said support member, said drive member drivingly engaging said gear wheel, a releasable clutch interposed between said gear wheel and said support member, and drive mechanism operatively connecting said gear wheel to said outlet member said drive mechanism being adapted to effect relative pivoting movement between the outlet member and the support member when said gear wheel rotates relatively to said support member.

3. A nozzle as claimed in claim 2 in which said drive mechanism comprises a pinion carried by said support member and meshing with said gear wheel, and a screw-and-nut drive means, the screw of which is connected to said outlet member.

4. A nozzle comprising a hollow casing member through which a fluid is discharged, a hollow support member, a first mounting connecting said support member to said casing member, a hollow outlet member, a second mounting connecting said outlet member to said support member, fluid which is discharged from said casing member passing successively through said support member and said outlet member and being deflected depending on the positions of the support member and the outlet member relative to the casing member, said first mounting permitting relative rotation between the support member and the casing member and said second mounting comprising a pivot connection and permitting only relative pivoting movement between the outlet member and the support member whereby said outlet member is both rotatable and pivotable relative to said casing member, said nozzle having a drive device for effecting both rotating and pivoting movement of said outlet member relative to said casing member, said drive device including a drive member which is mounted on the casing member, a gear wheel rotatably mounted about said support member, said drive member drivingly engaging said gear wheel, a releasable clutch interposed between said gear wheel and said support member and normally interconnecting them together, engageable abutments carried by said support member and said casing member respectively for limiting relative rotation therebetween, said clutch being automatically disengaged when said abutments are engaged to permit rotation of said gear wheel relative to said support member, and drive mechanism mounted on said support member and coupling said gear wheel to said outlet member for pivoting the latter about said pivot connection when the gear wheel rotates relatively to the support member.

5. A nozzle as claimed in claim 4 in which said releasable clutch comprises at least one detent member carried by said gear wheel, a plurality of recesses formed on said support member, and resilient means urging said detent member into engagement with a registering one of said recesses.

References Cited by the Examiner
UNITED STATES PATENTS

| 557,799 | 4/96 | Gorter | 239—587 X |
| 2,933,891 | 4/60 | Britt | 60—35.55 |
| 2,947,499 | 8/60 | Douglas. | |

FOREIGN PATENTS

| 24,931 | 7/22 | France. |
| 688,011 | 2/53 | Great Britain. |

SAMUEL LEVINE, *Primary Examiner.*